US009389600B2

(12) United States Patent
Ko et al.

(10) Patent No.: US 9,389,600 B2
(45) Date of Patent: Jul. 12, 2016

(54) CENTRAL CONTROL SYSTEM AND METHOD FOR SETTING CONTROL POINT THEREOF

(75) Inventors: Seungtae Ko, Seoul (KR); Sangchul Youn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 383 days.

(21) Appl. No.: 13/980,745

(22) PCT Filed: Jan. 17, 2012

(86) PCT No.: PCT/KR2012/000386
§ 371 (c)(1),
(2), (4) Date: Jul. 19, 2013

(87) PCT Pub. No.: WO2012/099372
PCT Pub. Date: Jul. 26, 2012

(65) Prior Publication Data
US 2013/0297080 A1    Nov. 7, 2013

(30) Foreign Application Priority Data

Jan. 21, 2011    (KR) .......................... 10-2011-0006546

(51) Int. Cl.
*G06F 19/00*    (2011.01)
*G05B 15/02*    (2006.01)
(Continued)

(52) U.S. Cl.
CPC .............. G05B 15/02 (2013.01); F24F 11/006 (2013.01); H04L 12/2816 (2013.01); H04L 67/125 (2013.01); *F24F 2011/0067* (2013.01); *F24F 2011/0068* (2013.01)

(58) Field of Classification Search
CPC ........... F24F 11/006; F24F 2011/0067; G05B 2219/23043; G05B 15/02; H01L 67/125; H01L 12/2816

USPC .................................................. 700/276, 277
See application file for complete search history.

(56) References Cited

U.S. PATENT DOCUMENTS 4,335,320 A * 6/1982 Garver .................. G05D 23/20
165/207
7,774,101 B2 * 8/2010 Ballate .................. G06Q 10/06
340/573.4
(Continued)

FOREIGN PATENT DOCUMENTS

EP    2 083 226 A2    7/2009
JP    2001-108284 A    4/2001
(Continued)

OTHER PUBLICATIONS

Korean Office Action dated Nov. 8, 2012 issued in Application No. 10-2011-0006546.
(Continued)

*Primary Examiner* — Michael D Masinick
(74) *Attorney, Agent, or Firm* — KED & Associates, LLP

(57) ABSTRACT

Disclosed are a central control system and a method for setting a control point thereof. A central controller or a control point generator generates a control map in which control points are indicated, and the control points and attribute data of devices such as indoor units on the spot in actuality are automatically matched through a mobile terminal. Also, attribute data required for setting a control point is made into a database by using a dedicated tool such as the central controller or the control point generator, thus automatically setting control points. Also, the central control system can be installed by setting attribute data of the respective control points by using a wireless solution such as a mobile terminal, without having technical knowledge.

13 Claims, 13 Drawing Sheets

(51) Int. Cl.
*F24F 11/00* (2006.01)
*H04L 12/28* (2006.01)
*H04L 29/08* (2006.01)

(56) References Cited

U.S. PATENT DOCUMENTS

| | | | |
|---|---|---|---|
| 9,020,647 B2* | 4/2015 | Johnson | F24F 11/001 700/276 |
| 2006/0038672 A1* | 2/2006 | Schoettle | G08B 21/0484 340/522 |
| 2006/0254294 A1* | 11/2006 | Shimamoto | F24F 3/065 62/238.7 |
| 2007/0012052 A1* | 1/2007 | Butler | F24F 11/0009 62/181 |
| 2008/0185448 A1 | 8/2008 | Kim et al. | 236/51 |
| 2009/0018673 A1* | 1/2009 | Dushane | G05B 19/042 700/9 |
| 2009/0261174 A1* | 10/2009 | Butler | F24F 11/006 236/51 |
| 2011/0238223 A1* | 9/2011 | Narayanamurthy | F24F 5/0046 700/277 |
| 2012/0169584 A1* | 7/2012 | Hwang | H04L 12/2818 345/156 |

FOREIGN PATENT DOCUMENTS

| | | |
|---|---|---|
| JP | 2004-332995 A | 11/2004 |
| KR | 10-2005-0094257 A | 9/2005 |
| KR | 10-2006-0117533 A | 11/2006 |

OTHER PUBLICATIONS

International Search Report and Written Opinion dated Sep. 27, 2012 issued in Application No. PCT/KR2012/000386.
Korean Notice of Allowance dated May 28, 2013 issued in Application No. 10-2011-0006546.

* cited by examiner

CENTRAL CONTROL SYSTEM AND METHOD FOR SETTING CONTROL POINT THEREOF

CROSS-REFERENCE TO RELATED PATENT APPLICATIONS

This application is a U.S. National Stage Application under 35 U.S.C. §371 of PCT Application No. PCT/KR2012/000386, filed on Jan. 17, 2012, which claims priority to Korean Patent Application No. 10-2011-0006546, filed Jan. 21, 2011.

TECHNICAL FIELD

The present invention relates to a central control system which is connected to a sub-system through a network and sets control points in devices within the sub-system to control the devices, and a method for setting a control point in the central control system.

BACKGROUND ART

Recently, as facilities of buildings have been modernized, automatic control systems for automatically controlling sub-systems for power, illumination, air-conditioning, prevention of disaster (or anti-disaster), crime prevention (or anti-crime), and the like, have been extending. In line with this, development of a central control system, such as a building management system (BMS), or the like, capable of integrally or collectively managing sub-systems as a whole, has been actively made.

In general, a central control system is based on a monitoring point, which is also called a control point, to be controlled or monitored. Users, and so on, may set several control points or a single control point in a device (or equipment) within a single sub system and perform monitoring, controlling, or the like, on the sub-system through a corresponding control point value. An engineer may set corresponding control points according to types and forms of sub-systems installed in a building and register set control points to the central control system to automatically control the building.

In installing the central control system, setting and registering control points play a significant role in the installation operation, require a long period, and are dependent upon the ability of an engineer. Most operations of the building management system are performed by controlling or monitoring control points.

Meanwhile, in the central control system, in order to control an air conditioner, an accurate position (or location) of an indoor unit should be known (or recognized). In the related art, a manager installs a product, sets an attribute such as a logical address, or the like, of the indoor unit, manually creates a table, and delivers the created table to a manager of the central control system. Then, the manager of the central control system should manually match the accurate position and the attribute of the indoor unit by using the table, which is inconvenient. Namely, the related art central control system has a problem in which the position and the attribute of the indoor unit are frequently mismatched and an installation time is lengthened.

DISCLOSURE OF INVENTION

Technical Problem

Therefore, an object of the present invention is to provide a central control system capable of easily centrally controlling an air conditioner by automatically setting a control point in an indoor unit, or the like, and a method for setting a control point thereof.

Another object of the present invention is to provide a central control system capable of preventing occurrence of a phenomenon in which an attribute is mismatched in setting a control point in an air conditioner and reducing an installation time, and a method for setting a control point thereof.

Solution to Problem

According to an aspect of the present invention, there is provided a central control system including: an air conditioner configured to include a plurality of indoor units performing air-conditioning and one or more outdoor units connected to the indoor units to drive the indoor units; a central controller configured to generate a control point with respect to each of the indoor units and control the air conditioner by using the control points; and a mobile terminal configured to receive attribute data items with respect to the control points of the indoor units from the indoor units and transmit the attribute data items to the central controller.

The central controller may match the indoor units and the control points by using the attribute data items.

The mobile terminal may match the indoor units and the control points by using the attribute data items and transmit control points in which the attributed data items are set to the central controller.

The central controller may include: a control module configured to generate a control map in which the control points are positioned, and generate control point information including position information of the control points and address information of the control points in the control map; a first communication module configured to transmit control data to the air conditioner and receive operation data from the air conditioner; and a second communication module configured to transmit the control point information to the mobile terminal and receive the attribute data items from the mobile terminal.

The mobile terminal may include: a wireless communication unit configured to receive the attribute data items from the indoor units, receive the control information from the second communication module, and transmit the attribute data items or the control points in which the attribute data items are set to the second communication module; and a controller configured to set the attribute data items in the control points and match the indoor units and the control points.

The central control system may further include: a control point generator configured to generate a control map in which the control points are positioned, and generate control point information including position information of the control points and address information of the control points in the control map.

The mobile terminal may generate a control map in which the control points are positioned, and generate control point information including position information of the control points and address information of the control points in the control map.

The central control system may further include: a database server configured to be connected to the central controller, make the control point information into a database and store the same.

The central control system may further include: a gateway connected between the central controller and the air conditioner and allowing the central controller to control the air conditioner by converting a communication protocol, or controlling the air conditioner by using an installed control algorithm.

According to another aspect of the present invention, there is provided a method for setting a control point in a central control system which includes an air conditioner including a plurality of indoor units performing air-conditioning and one or more outdoor units connected to the indoor units to drive the indoor units, and a central controller connected to the air conditioner to centrally control the air conditioner, including: generating a control point with respect to each of the indoor units, and generating a control map in which the control points are positioned, and control point information including position information of the control points and address information of the control points in the control map; transmitting the control point information to a mobile terminal; receiving, by the mobile terminal, attribute data items regarding the control point information of the indoor units from the indoor units; and matching, by the mobile terminal, the indoor units and the control points by using the attribute data items. Also, the method may further include: transmitting, by the mobile terminal, the control points in which the attribute data items are set to the central controller.

According to another aspect of the present invention, there is provided a method for setting a control point in a central control system which includes an air conditioner including a plurality of indoor units performing air-conditioning and one or more outdoor units connected to the indoor units to drive the indoor units, and a central controller connected to the air conditioner to centrally control the air conditioner, including: generating, by the central controller, a control point with respect to each of the indoor units, and generating a control map in which the control points are positioned, and control point information including position information of the control points and address information of the control points in the control map; transmitting, by the central controller, the control point information to a mobile terminal; receiving, by the mobile terminal, attribute data items regarding the control point information of the indoor units from the indoor units; transmitting, by the mobile terminal, the attribute data items to the central controller; and matching, by the central controller, the indoor units and the control points by using the control point information and the attribute data items.

According to another aspect of the present invention, there is provided a method for setting a control point in a central control system which includes an air conditioner including a plurality of indoor units performing air-conditioning and one or more outdoor units connected to the indoor units to drive the indoor units, a central controller connected to the air conditioner to centrally control the air conditioner, and a control point generator generating control points with respect to respective indoor units, including: generating, by the control point generator, a control point with respect to each of the indoor units, and generating a control map in which the control points are positioned, and control point information including position information of the control points and address information of the control points in the control map; transmitting, by the control point generator or the central controller, the control point information to a mobile terminal; receiving, by the mobile terminal, attribute data items regarding the control point information of the indoor units from the indoor units; and matching, by the mobile terminal, the indoor units and the control points by using the attribute data items.

According to another aspect of the present invention, there is provided a method for setting a control point in a central control system which includes an air conditioner including a plurality of indoor units performing air-conditioning and one or more outdoor units connected to the indoor units to drive the indoor units, a central controller connected to the air conditioner to centrally control the air conditioner, and a control point generator generating control points with respect to respective indoor units, including: generating, by the control point generator, a control point with respect to each of the indoor units, and generating a control map in which the control points are positioned, and control point information including position information of the control points and address information of the control points in the control map; transmitting, by the control point generator or the central controller, the control point information to a mobile terminal; receiving, by the mobile terminal, attribute data items regarding the control point information of the indoor units from the indoor units; transmitting, by the mobile terminal, the attribute data items to the central controller; and matching, by the central controller, the indoor units and the control points by using the control point information and the attribute data items.

According to another aspect of the present invention, there is provided a method for setting a control point in a central control system which includes an air conditioner including a plurality of indoor units performing air-conditioning and one or more outdoor units connected to the indoor units to drive the indoor units, a central controller connected to the air conditioner to centrally control the air conditioner, and a mobile terminal generating control points with respect to respective indoor units, including: generating, by the mobile terminal, a control point with respect to each of the indoor units, and generating a control map in which the control points are positioned, and control point information including position information of the control points and address information of the control points in the control map; transmitting, by the mobile terminal, the control point information to the central controller; receiving, by the mobile terminal, attribute data items regarding the control point information of the indoor units from the indoor units; transmitting, by the mobile terminal, the attribute data items to the central controller; and matching, by the central controller, the indoor units and the control points by using the control point information and the attribute data items.

According to another aspect of the present invention, there is provided a method for setting a control point in a central control system which includes an air conditioner including a plurality of indoor units performing air-conditioning and one or more outdoor units connected to the indoor units to drive the indoor units, a central controller connected to the air conditioner to centrally control the air conditioner, and a mobile terminal generating control points with respect to respective indoor units, including: generating, by the mobile terminal, a control point with respect to each of the indoor units, and generating a control map in which the control points are positioned, and control point information including position information of the control points and address information of the control points in the control map; receiving, by the mobile terminal, attribute data items regarding the control point information of the indoor units from the indoor units; matching, by the mobile terminal, the indoor units and the control points by using the attribute data items; and transmitting, by the mobile terminal, the control points in which the attribute data are set to the central controller.

Advantageous Effects of Invention

According to embodiments of the present invention, the central controller or the control point generator generates a control map in which control points are indicated, and automatically matches the control points and attribute data of devices such as indoor units on the spot in actuality, thereby shortening an installation time and increasing operation efficiency.

According to embodiments of the present invention, control points are automatically set by generating a database by using a dedicated tool such as the central controller or the control point generator with respect to attribute data required for setting a control point, and an installation time can be shortened.

According to embodiments of the present invention, a central control system can be installed by setting attribute data of respective control points by using a wireless solution such as a mobile terminal, without having technical knowledge, whereby stability of the system can be guaranteed and user convenience can be enhanced.

BEST MODE FOR CARRYING OUT THE INVENTION

Figure 1:
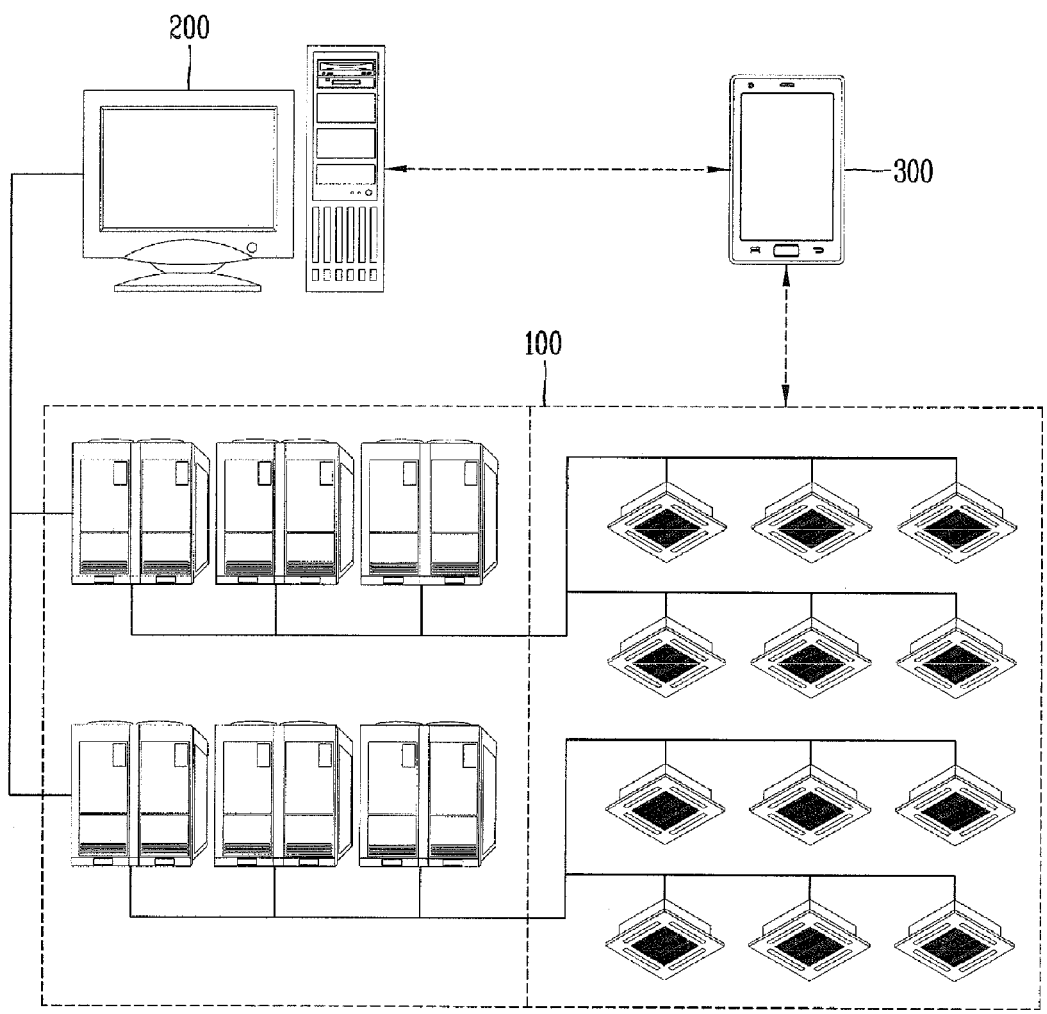
FIGS. 1 through 5 are views schematically showing the configurations of a central control system according to embodiments of the present invention, respectively.

With reference to FIG. 1, a central control system according to an embodiment of the present invention may be configured to include an air conditioner 100 which includes a plurality of indoor units 110 performing air-conditioning and one or more outdoor units 120 connected to the indoor units 110 to drive the indoor units 110, a central controller 200 which generates a control point with respect to each of the indoor units and controls the air conditioner 100 by using the control points, and a mobile terminal 300 which receives attribute data items with respect to the control points of the indoor units 110 from the indoor units 110 and transmits the attribute data items to the central controller 200. Here, the mobile terminal matches the indoor units 110 and the control points by using the attribute data items and transmits the control points in which the attribute data items are set to the central controller 200.

In the following embodiments of the present invention, the mobile terminal 300 may include a mobile phone, a smart phone, a laptop computer, a digital broadcast terminal, a personal digital assistant (PDA), a portable multimedia player (PMP), a navigation device, and the like, and may have a type of a system dedicated terminal.

Figure 14:
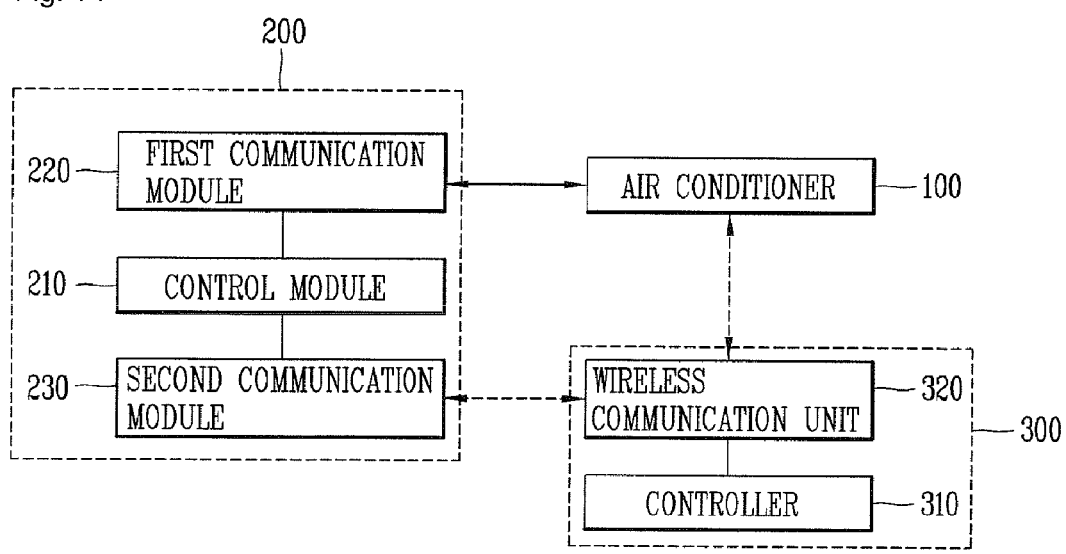
FIG. 14 is a block diagram showing a detailed configuration of a central controller and a mobile terminal in FIGS. 1 through 6.

With reference to FIG. 14, the central controller 200 includes a control module 210 which generates a control map in which the control points are positioned, and generates control point information including position information of the control points and address information of the control points in the control map. The central controller 200 may include a first communication module 220 which transmits control data to the air conditioner 100 and receives operation data from the air conditioner, and a second communication module 230 which transmits the control point information to the mobile terminal 300 and receives the attribute data items from the mobile terminal 300.

The first communication module 220 may be connected to the air conditioner 100 via a network such as the Internet, or the like, to transmit and receive data. The control module 210 may generate control data for operating the air conditioner 100. The central controller 200 may transmit the control data to the air conditioner 100 through the first communication module 220. The air conditioner 100 may transmit control results according to the control data or operation data such as status information, or the like, to the central controller 200 through the first communication module 220.

The second communication module 230, a module allowing the central controller 200 to wirelessly communicate with the mobile terminal 300, includes a mobile communication module, a wireless Internet module, a short-range communication module, and the like. The control module 210 generates a control map in which the control points are positioned, and generates control point information including position information of the control points and address information such as a network address, logical, physical address, or the like, of the control points in the control map. The second communication module 220 transmits the control point information to the mobile terminal 300. Also, the second communication module 230 receives results obtained by matching the indoor units and the control points installed on the spot in actuality from the mobile terminal 300. Namely, the mobile terminal 300 receives the attribute data items of the indoor units from the corresponding indoor units 110 installed on the spot, compares and matching the received attribute data items with the control points generated by the control module 210, and transmits the results. The second communication module 230 receives the matching results and transfers the same to the control module 210.

With reference to FIG. 14, the mobile terminal 300 may include a wireless communication unit 320 that receives the attribute data items from the indoor units 110, receives the control point information from the second communication module 230, and transmits the attribute data items or the control points in which the attribute data items are set to the second communication module 230, and a controller 3310 which sets the attribute data items in the control points and matches the indoor units and the control points.

The wireless communication unit 320 may include one or more modules allowing for wireless communication between the mobile terminal 300 and the central controller or between the mobile terminal 300 and the indoor units 110. For example, the wireless communication unit 320 may include a broadcast receiving module, a mobile communication module, a wireless Internet module, a short-range communication module, a position information module, and the like. The broadcast receiving module receives a broadcast signal and/ore broadcast associated information from an external broadcast management server via a broadcast channel. The broadcast associated information may be information related to a broadcast channel, a broadcast program, a broadcast service provider, and the like. The mobile communication module transmits and receives a radio signal to and from at least one of a base station, an external terminal, and a server in the mobile communication network. The radio signal may include various types of data according to a voice call signal, a video call signal, or a text/multimedia message transmission/reception. The wireless Internet module refers to a module for a wireless Internet access, which may be installed within the mobile terminal or outside the mobile terminal. As the wireless Internet access technique, a WLAN (Wireless LAN), Wi-Fi, Wibro (Wireless broadband), Wimax (World Interoperability for Microwave Access), HSDPA (High Speed Downlink Packet Access), or the like, may be used. The short-range communication module refers to a module for supporting short range communications. As the short-range communication technology, Bluetooth™, Radio Frequency IDentification (RFID), Infrared Data Association (IrDA), Ultra-WideBand (UWB), ZigBee™, and the like, may be used. The position information module refers to a module for ascertaining or obtaining a location of the mobile terminal. The position information module may be, for example, a global positioning system (GPS) module.

In an embodiment of the present invention, the controller 310 matches the indoor units and the control points by using the attribute data of the respective indoor units 110 received by the wireless communication unit 320 from the indoor units 110 and the control point information received by the wireless communication unit 320 from the central controller 200. For example, the controller 310 determines whether or not the indoor units 110 exist at the positions of the control points or whether or not the control map has been created to correspond to the positions of the indoor units on the spot in actuality. Also, the controller 310 compares the address information, namely, a network address, a logical address, a physical address, and the like, of the control points with the actual attribute data of the indoor units 110 to determine whether or not they are identical. And then, the controller 310 matches the indoor units and the control points based on the determination results.

Figure 8:
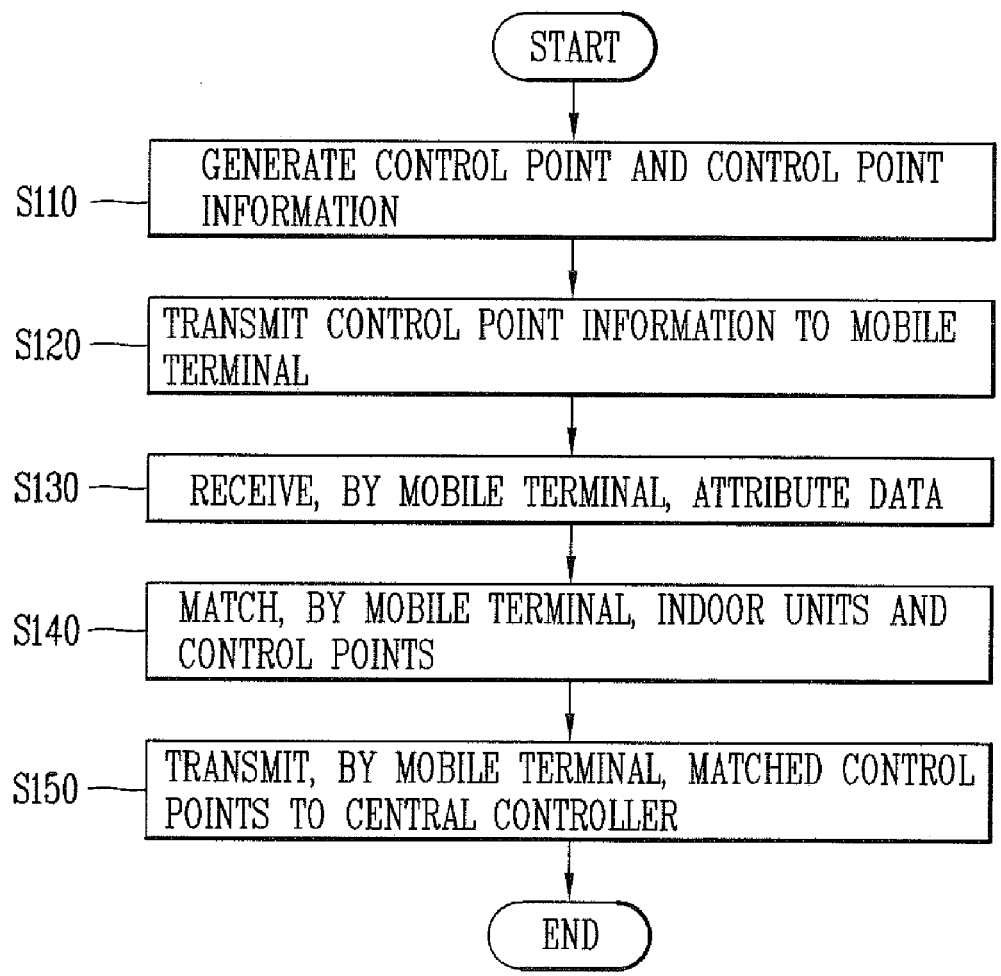
FIGS. 8 through 13 are flow charts illustrating a method for setting a control point in a central control system according to embodiments of the present invention.

With reference to FIG. 8, according to an embodiment of the present invention, a method for setting a control point in a central control system which includes an air conditioner including a plurality of indoor units performing air-conditioning and one or more outdoor units connected to the indoor units to drive the indoor units, and a central controller connected to the air conditioner to centrally control the air conditioner, includes a step (S110) of generating a control point with respect to each of the indoor units, and generating a control map in which the control points are positioned, and control point information including position information of the control points and address information of the control points in the control map, a step (S120) of transmitting the control point information to a mobile terminal, a step (S130) of receiving, by the mobile terminal, attribute data items regarding the control point information of the indoor units from the indoor units, a step (S140) of matching, by the mobile terminal, the indoor units and the control points by using the attribute data items. Also, the method for setting a control point in a central control system may further include a step (S150) of transmitting, by the mobile terminal, the control points in which the attribute data items are set to the central controller.

Figure 6:
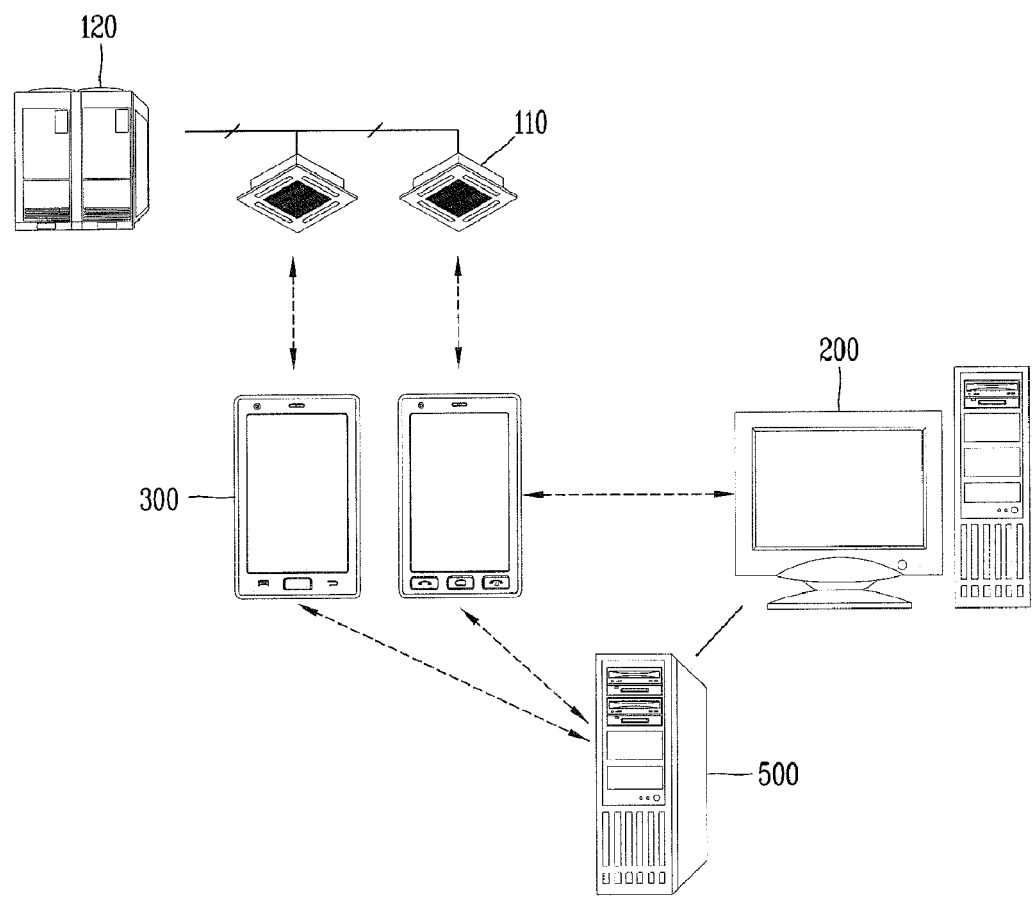
FIG. 6 is a view explaining an operation of matching attribute data of an indoor unit by using a mobile terminal in FIGS. 1 through 5.
Figure 7:
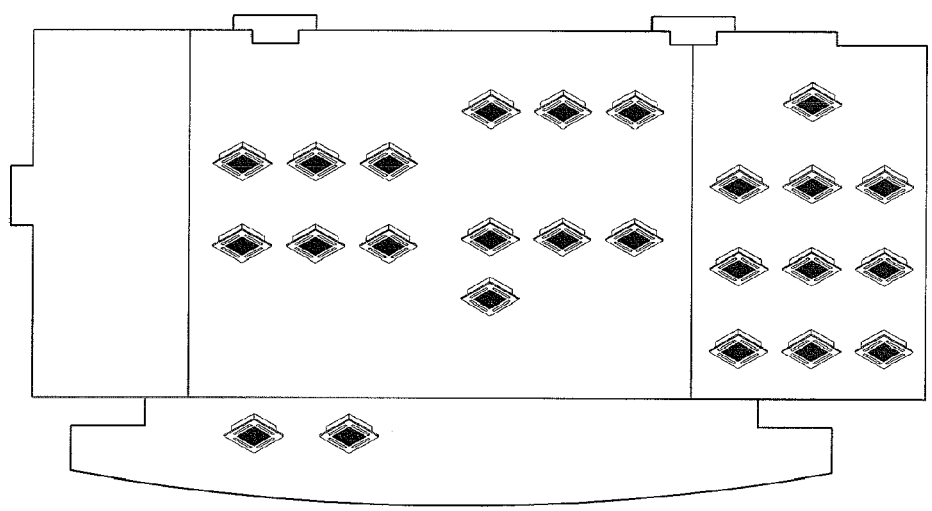
FIG. 7 is a view showing an example of a control map including control points according to embodiments of the present invention.

First, the central controller generates a control map as shown in FIG. 7. The control map includes a plurality of control points, and each of the control points has control point information including position information and address information of the control points in the map (S110). The central controller transmits the control point information to the mobile terminal through a wireless communication scheme (S120). Of course, the central controller may be connected to an interface of the mobile terminal according to a fixed line communication scheme such as a USB, or the like, to transmit the control point information. The mobile terminal may perform communication with the indoor units installed on the spot in actuality according to a wireless communication scheme. As shown in FIG. 6, the mobile terminal receives attribute data from the indoor units (S130). Here, the attribute data may be physical data such as a manufacturer of the indoor units, a product name, a product number, capacity, and the like, attribute values of a physical address and a logical address within the air conditioner, data such as a position of an indoor unit, or the like. The mobile terminal compares the control point information with the attribute data and matches the indoor units and the control points (S140). And then, the mobile terminal transmits the matching results to the central controller (S150). The central controller may generate control data for controlling the indoor units through the respective control points based on the matching results.

Figure 2:
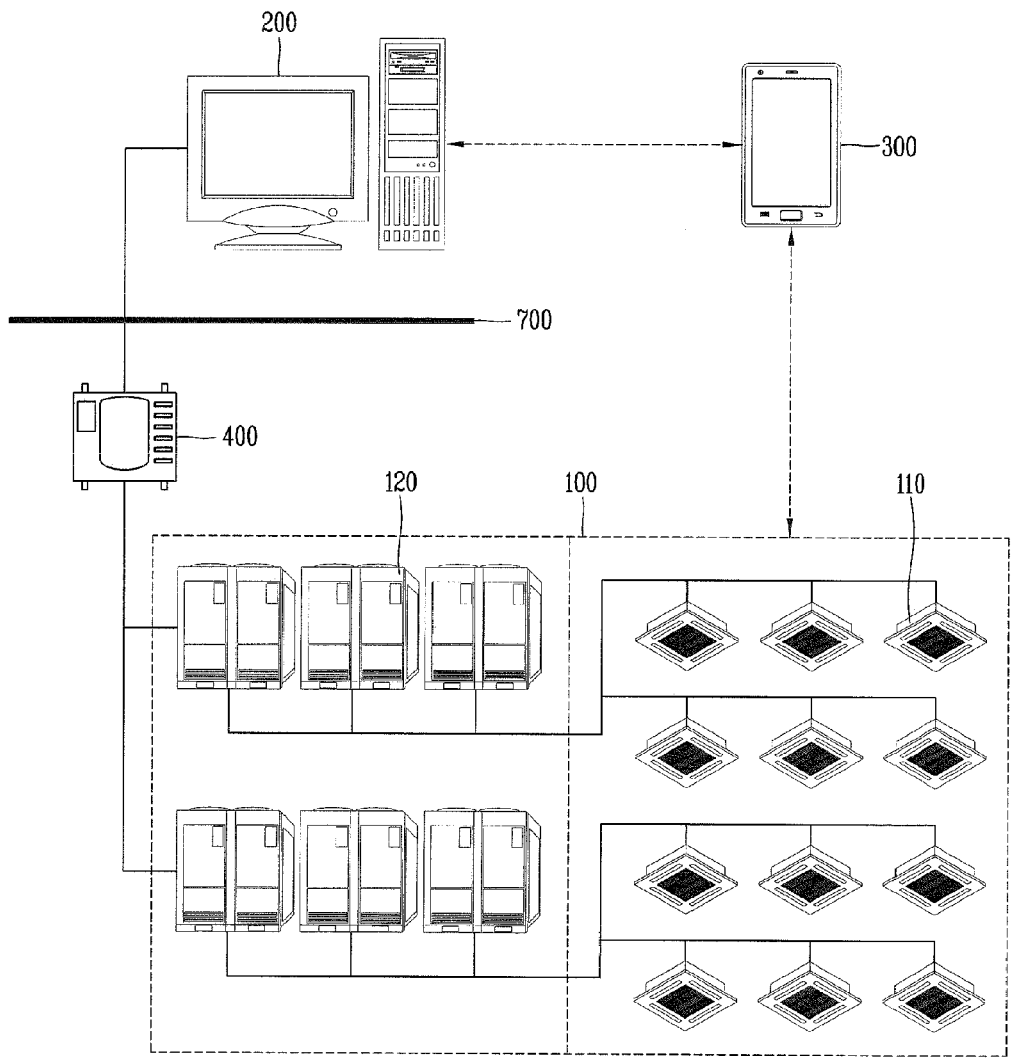

With reference to FIG. 2, the central control system may further include a gateway 400 which is connected between the central controller 200 and the air conditioner 100, allows the central controller to control the air conditioner by converting a communication protocol, or controls the air conditioner by using an installed control algorithm. The gateway 400 may be connected to the respective outdoor units 120 according to a dedicated line communication scheme such as RS-485, or the like, or by a local area network (LAN), or the like, to transmit or receive data. The gateway 400 may be connected to the central controller 200 through the Internet to receive control data regarding the outdoor units and the indoor units, and may allow the central controller 200 to directly control the outdoor units and the indoor units according to the control data or may directly control the outdoor units or the indoor units according to an installed control algorithm.

Figure 3:
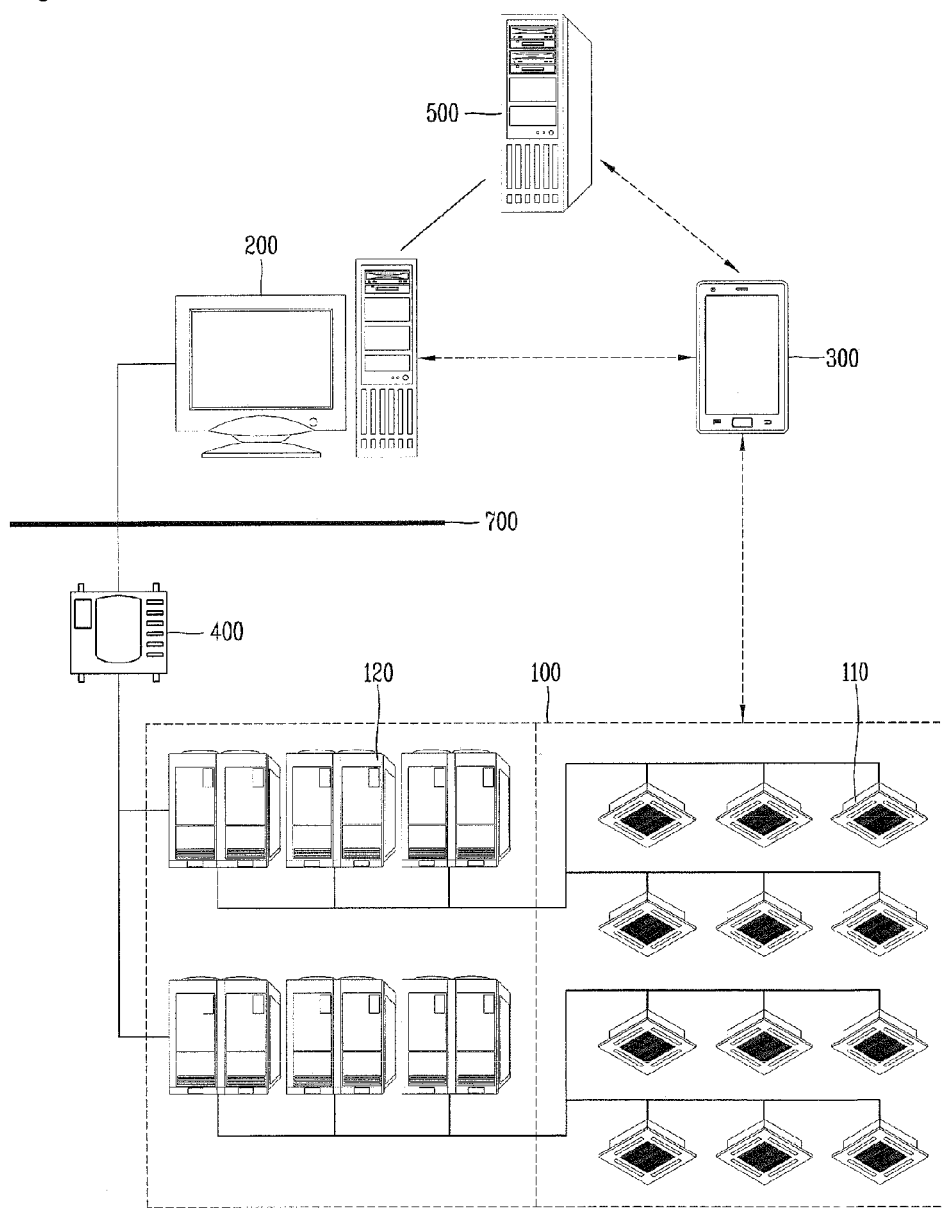

With reference to FIG. 3, the central control system may further include a database server 500 which is connected to the central controller 200 and makes the control point information into a database and storing the same. The database server 500 may make the control point information, i.e., the control map, position information of the control points on the control map, physical addresses and logical addresses of the control points, actual positions of the indoor units, the results obtained by matching the indoor units and the control points, and the like, into a database, and store the same. The mobile terminal 300 may be directly connected to the database server 500, rather than being connected to the central controller 200 to receive the control point information.

With reference back to FIG. 1, a central control system according to an embodiment of the present invention may be configured to include the air conditioner 100 which includes a plurality of indoor units 110 performing air-conditioning and one or more outdoor units 120 connected to the indoor units 110 to drive the indoor units 110, the central controller 200 which generates a control point with respect to each of the indoor units and controls the air conditioner 100 by using the control points, and the mobile terminal 300 which receives attribute data items with respect to the control points of the indoor units 110 from the indoor units 110 and transmits the attribute data items to the central controller 200. Here, the central controller 200 matches the indoor units 110 and the control points by using the attribute data items.

In the following description, the repeated content and explanation as those in the above embodiment will be omitted.

Figure 9:
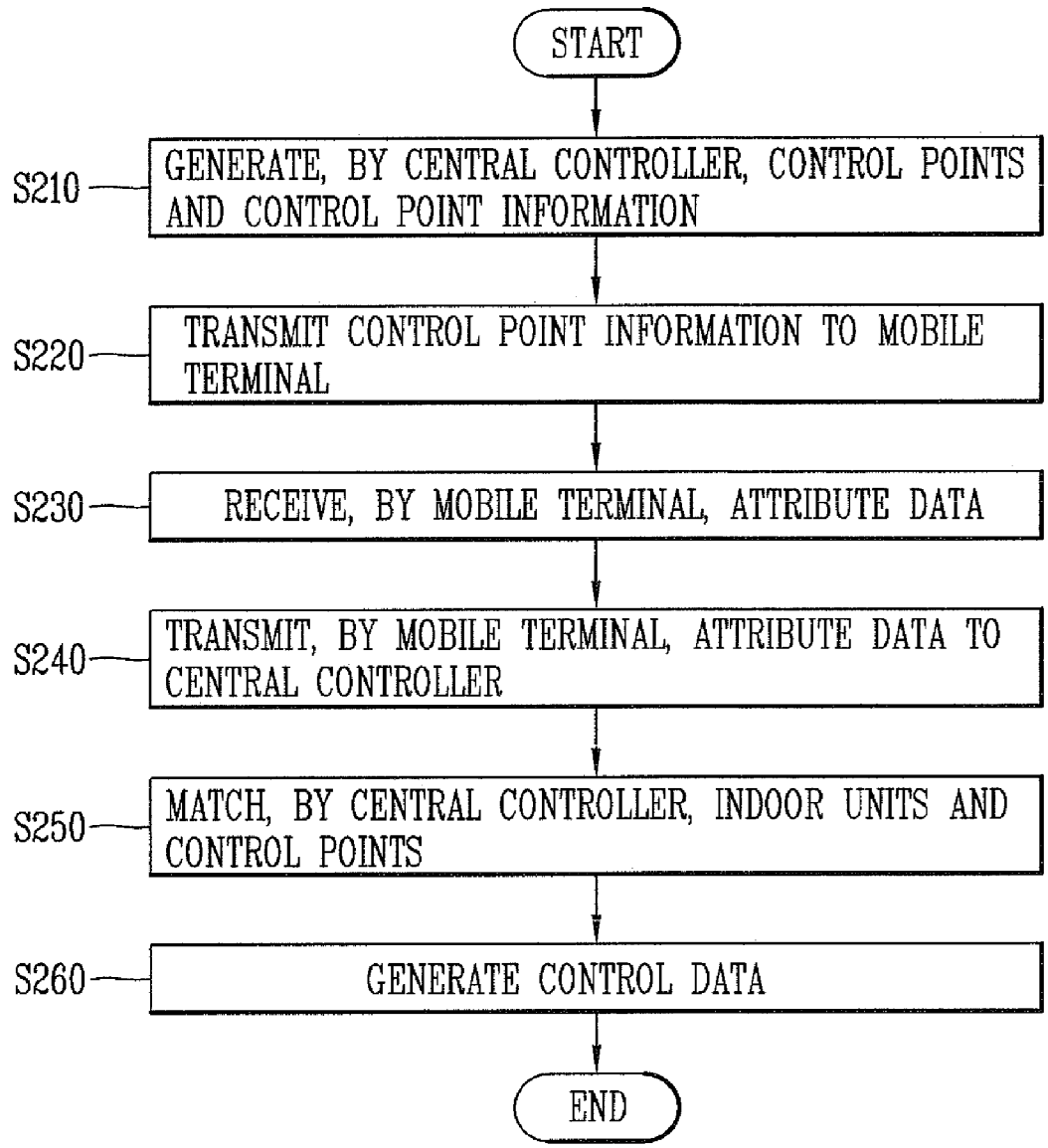

With reference to FIG. 9, according to an embodiment of the present invention, a method for setting a control point in a central control system which includes an air conditioner including a plurality of indoor units performing air-conditioning and one or more outdoor units connected to the indoor units to drive the indoor units, and a central controller connected to the air conditioner to centrally control the air conditioner, includes a step (S210) of generating, by the central controller, a control point with respect to each of the indoor units, and generating a control map in which the control points are positioned, and control point information including position information of the control points and address information of the control points in the control map, a step (S220) of transmitting, by the central controller, the control point information to a mobile terminal, a step (S230) of receiving, by the mobile terminal, attribute data items regarding the control point information of the indoor units from the indoor units, a step (S240) of transmitting, by the mobile terminal, the attribute data items to the central controller, and a step (S250) of matching, by the central controller, the indoor units and the control points by using the control point information and the attribute data items. Also, the method for setting a control point in a central control system may further include a step (S260) of generating, by the central controller, control data by using the control point information and the attribute data items.

The central controller generates control points corresponding to the indoor units provided within the air conditioner. Here, if the central controller would know about a status of the indoor units in advance, the accuracy of an initial operation can be enhanced. Also, the central controller generates a control map as shown in FIG. 7. The control map includes a plurality of control points, and each of the control points has control point information including position information and address information of the control points in the control map (S210). The central controller transmits the control point information to the mobile terminal through a wireless communication scheme (S220). Of course, the central controller may be connected to an interface of the mobile terminal according to a fixed line communication scheme such as a USB, or the like, to transmit the control point information. The mobile terminal may perform communication with the indoor units installed on the spot in actuality according to a wireless communication scheme. As shown in FIG. 6, the mobile terminal receives attribute data from the indoor units 110 by using short-range wireless communication, or the like (S230). Here, the attribute data may be physical data such as a manufacturer of the indoor units, a product name, a product number, capacity, and the like, attribute values of a physical address and a logical address within the air conditioner, data such as a position of an indoor unit, or the like. When the mobile terminal transmits the attribute data items, which has been received from the indoor units 110, to the central controller (S240), the central controller compares the control point information with the attribute data and matches the indoor units and the control points (S250). The central controller may generate control data for controlling the indoor units through the respective control points based on the matching results (S260).

Figure 4:
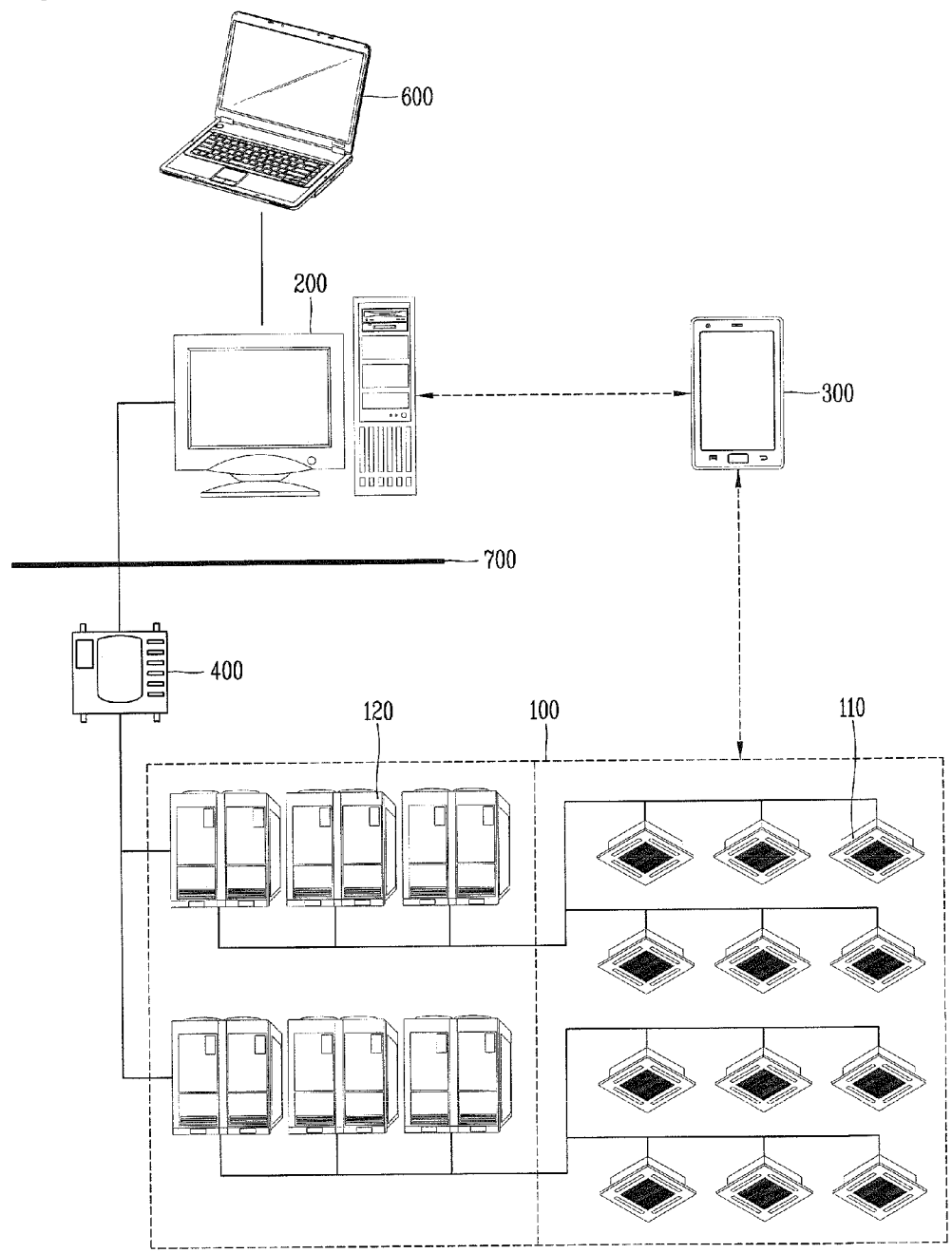

With reference to FIG. 4, a central control system according to an embodiment of the present invention may be configured to include the air conditioner 100 which includes a plurality of indoor units 110 performing air-conditioning and one or more outdoor units 120 connected to the indoor units 110 to drive the indoor units 110, the central controller 200 which controls the air conditioner 100 by using control points, the mobile terminal 300 which receives attribute data items with respect to the control points of the indoor units 110 from the indoor units 110 and transmits the attribute data items to the central controller 200, and a control point generator 600 which generates a control map in which the control points are positioned, and generates control point information including position information of the control points and address information of the control points in the control map.

Here, the mobile terminal 300 matches the indoor units 110 and the control points by using the attribute data items, and transmits the control points in which the attribute data items are set to the central controller 200.

The control point generator 600, a dedicated tool for creating a control map with reference to drawings, or the like, of a building, generates control point information including position information, address information, or the like, of the outdoor units and the indoor units constituting the air conditioner.

With reference to FIG. 4, the central control system may further include the gateway 400 which is connected between the central controller 200 and the air conditioner 100. The gateway 400 allows the central controller to control the air conditioner by converting a communication protocol, or controls the air conditioner by using an installed control algorithm. The gateway 400 may be connected to the respective outdoor units 120 according to a dedicated line communication scheme such as RS-485, or the like, or by a local area network (LAN), or the like, to transmit or receive data. The gateway 400 may be connected to the central controller 200 through the Internet to receive control data regarding the outdoor units and the indoor units, and may allow the central controller 200 to directly control the outdoor units and the indoor units according to the control data or may directly control the outdoor units or the indoor units according to an installed control algorithm.

Figure 5:
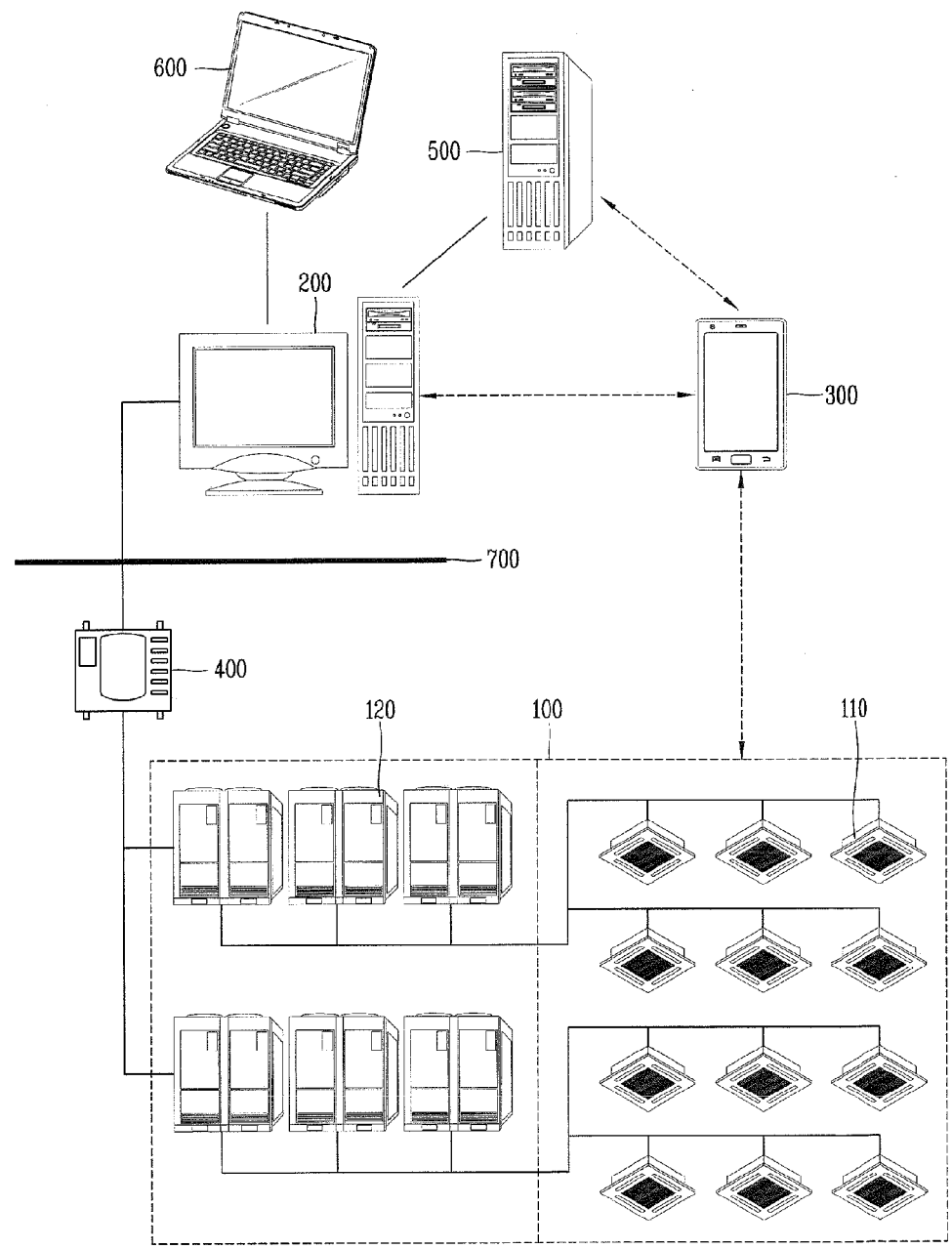

With reference to FIG. 5, the central control system may further include a database server 500 which is connected to the central controller 200 and makes the control point information into a database and storing the same. The database server 500 may make the control point information, i.e., the control map, position information of the control points on the control map, physical addresses and logical addresses of the control points, actual positions of the indoor units, the results obtained by matching the indoor units and the control points, and the like, into a database, and store the same. The mobile terminal 300 may be directly connected to the database server 500, rather than being connected to the central controller 200 to receive the control point information.

In the following description, the repeated content and explanation as those in the above embodiment will be omitted.

Figure 10:
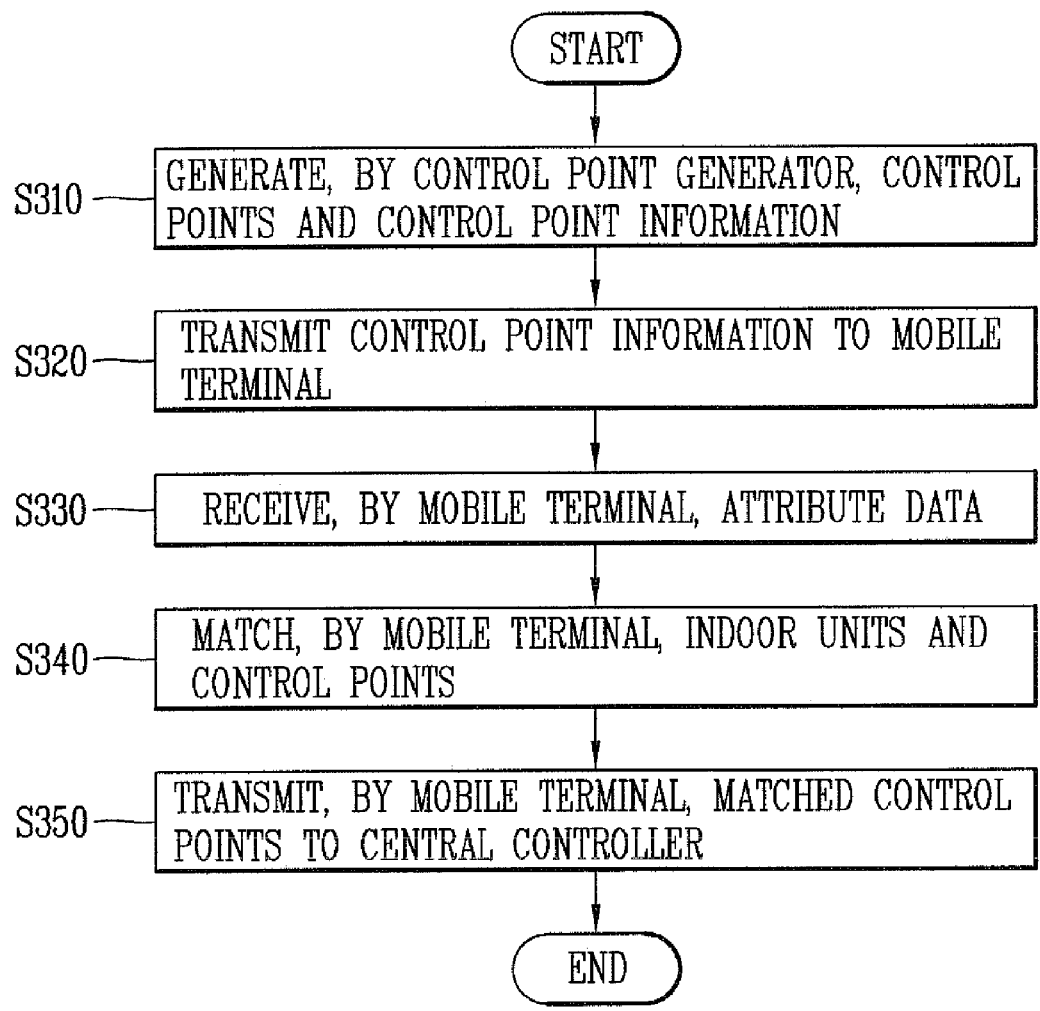

With reference to FIG. 10, according to an embodiment of the present invention, a method for setting a control point in a central control system which includes an air conditioner including a plurality of indoor units performing air-conditioning and one or more outdoor units connected to the indoor units to drive the indoor units, a central controller connected to the air conditioner to centrally control the air conditioner, and a control point generator generating a control point with respect to each of the indoor units, includes a step (S310) of generating, by the central controller, a control point with respect to each of the indoor units, and generating a control map in which the control points are positioned, and control point information including position information of the control points and address information of the control points in the control map, a step (S320) of transmitting, by the control point generator or the central controller, the control point information to a mobile terminal, a step (S330) of receiving, by the mobile terminal, attribute data items regarding the control point information of the indoor units from the indoor units, and a step (S340) of matching, by the mobile terminal, the indoor units and the control points by using the attribute data items. Also, the method for setting a control point in a central control system may further include a step (S350) of transmitting, by the mobile terminal, the control points in which the attribute data items are set to the central controller.

The central controller generates the control map as shown in FIG. 7. The control map includes a plurality of control points, and each of the control points has control point information including position information and address information of the control points in the control map (S310). The central controller may transmit the generated control map and the control point information to the central controller. The central controller may transmit the generated control map and the control point information to the central controller. The central controller transmits the control point information, which has been received from the control point generator, to the mobile terminal through a wireless communication scheme (S320). Of course, the central controller may be connected to an interface of the mobile terminal according to a fixed line communication scheme such as a USB, or the like, to transmit the control point information. Also, the control point generator and the mobile terminal may be connected according to a wired/wireless communication scheme, and the mobile terminal may directly receive the control point information (S320). The mobile terminal may perform communication with the indoor units installed on the spot in actuality according to a wireless communication scheme. As shown in FIG. 6, the mobile terminal receives attribute data from the indoor units (S330). Here, the attribute data may be physical data such as a manufacturer of the indoor units, a product name, a product number, capacity, and the like, attribute values of a physical address and a logical address within the air conditioner, data such as a position of an indoor unit, or the like. The mobile terminal compares the control point information and the attribute data and matches the indoor units and the control points (S340). And then, the mobile terminal transmits again the matching results to the central controller (S350). The central controller may generate control data for controlling the indoor units through the respective control points based on the matching results.

With reference to FIG. 4, a central control system according to an embodiment of the present invention may be configured to include the air conditioner 100 which includes a plurality of indoor units 110 performing air-conditioning and one or more outdoor units 120 connected to the indoor units 110 to drive the indoor units 110, the central controller 200 which controls the air conditioner 100 by using control points, the mobile terminal 300 which receives attribute data items with respect to the control points of the indoor units 110 from the indoor units 110 and transmits the attribute data items to the central controller 200, and the control point generator 600 which generates a control map in which the control points are positioned, and generates control point information including position information of the control points and address information of the control points in the control map. Here, the central controller 200 matches the indoor units 110 and the control points by using the attribute data items.

In the following description, the repeated content and explanation as those in the above embodiment will be omitted.

Figure 11:
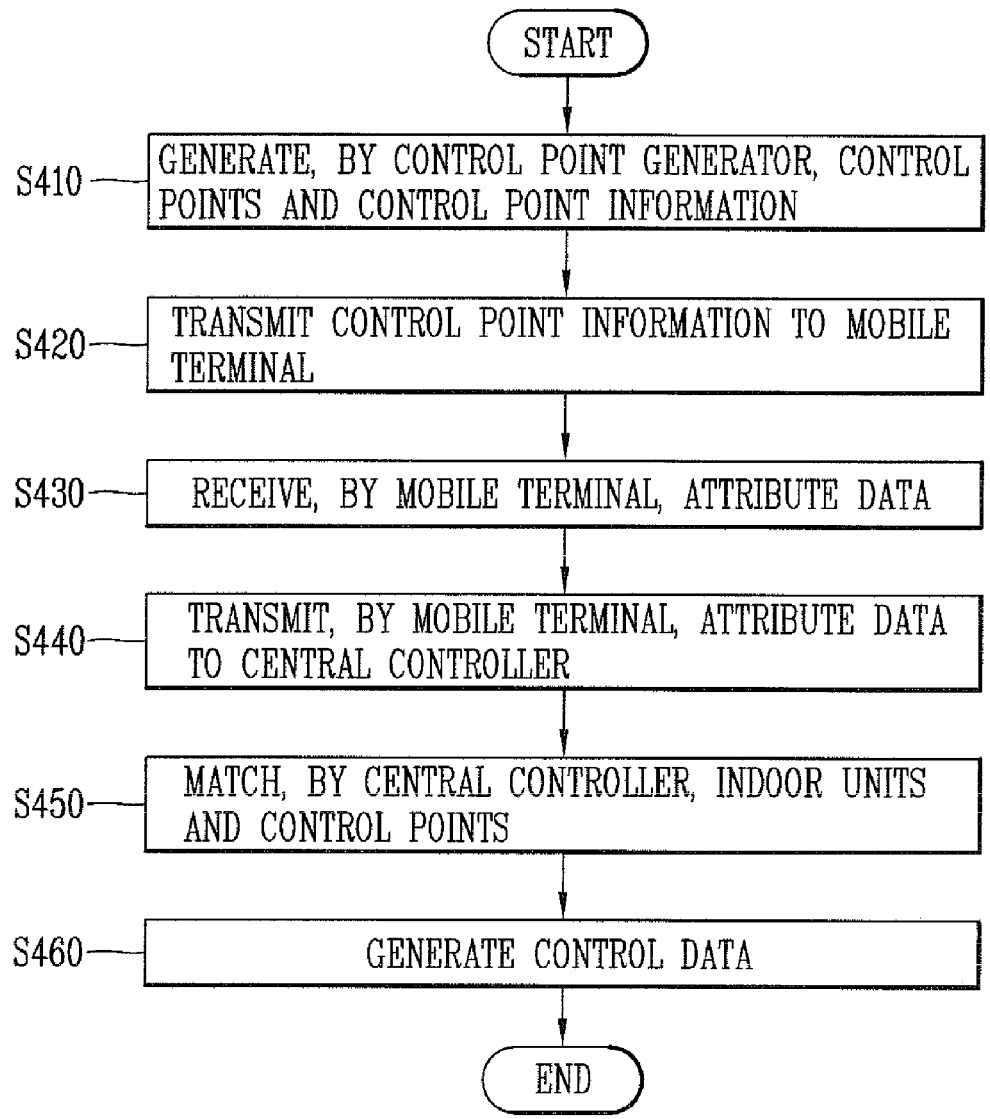

With reference to FIG. 11, according to an embodiment of the present invention, a method for setting a control point in a central control system which includes an air conditioner including a plurality of indoor units performing air-conditioning and one or more outdoor units connected to the indoor units to drive the indoor units, a central controller connected to the air conditioner to centrally control the air conditioner, and a control point generator generating a control point with respect to each of the indoor units, includes a step (S410) of generating, by the central controller, a control point with respect to each of the indoor units, and generating a control map in which the control points are positioned, and control point information including position information of the control points and address information of the control points in the control map, a step (S420) of transmitting, by the control point generator or the central controller, the control point information to a mobile terminal, a step (S430) of receiving, by the mobile terminal, attribute data items regarding the control point information of the indoor units from the indoor units, a step (S440) of transmitting, by the mobile terminal, the attribute data to the central controller, and a step (S450) of matching, by the central controller, the indoor units and the control points by using the control point information and the attribute data items. Also, the method for setting a control point in a central control system may further include a step (S460) of generating, by the central controller, control data by using the control point information and the attribute data items.

The control point generator generates the control map as shown in FIG. 7. The control map includes a plurality of control points, and each of the control points has control point information including position information and address information of the control points in the control map (S410). The control point generator may transmit the generated control map and the control point information to the central controller. The central controller transmits the control point information, which has been received from the control point generator, to the mobile terminal through a wireless communication scheme (S420). Of course, the central controller may be connected to an interface of the mobile terminal according to a fixed line communication scheme such as a USB, or the like, to transmit the control point information. Also, the control point generator and the mobile terminal may be connected according to a wired/wireless communication scheme, and the mobile terminal may directly receive the control point information (S420). As shown in FIG. 6, the mobile terminal receives attribute data from the indoor units by using short-range wireless communication, or the like (S430). Here, the attribute data may be physical data such as a manufacturer of the indoor units, a product name, a product number, capacity, and the like, attribute values of a physical address and a logical address within the air conditioner, data such as a position of an indoor unit, or the like. When the mobile terminal transmits the attribute data items, which have been received from the indoor units, to the central controller (S440), the central controller compares the control point information and the attribute data and matches the indoor units and the control points (S450). The central controller generates control data for controlling the indoor units through the respective control points based on the matching results (S460).

With reference to FIGS. 1 through 6, a central control system according to an embodiment of the present invention may be configured to include the air conditioner 100 which includes a plurality of indoor units 110 performing air-conditioning and one or more outdoor units 120 connected to the indoor units 110 to drive the indoor units 110, the central controller 200 which controls the air conditioner 100 by using control points, and the mobile terminal 300 which receives attribute data items with respect to the control points of the indoor units 110 from the indoor units 110 and transmits the attribute data items to the central controller 200. Here, the mobile terminal 300 generates a control map in which the control points are positioned, and generates control point information including position information of the control points and address information of the control points in the control map.

In an embodiment of the present invention, the mobile terminal 300 matches the indoor units 110 and the control points by using the attribute data items, and transmits the control points in which the attribute data items are set to the central controller 200.

In the following description, the repeated content and explanation as those in the above embodiment will be omitted.

Figure 12:
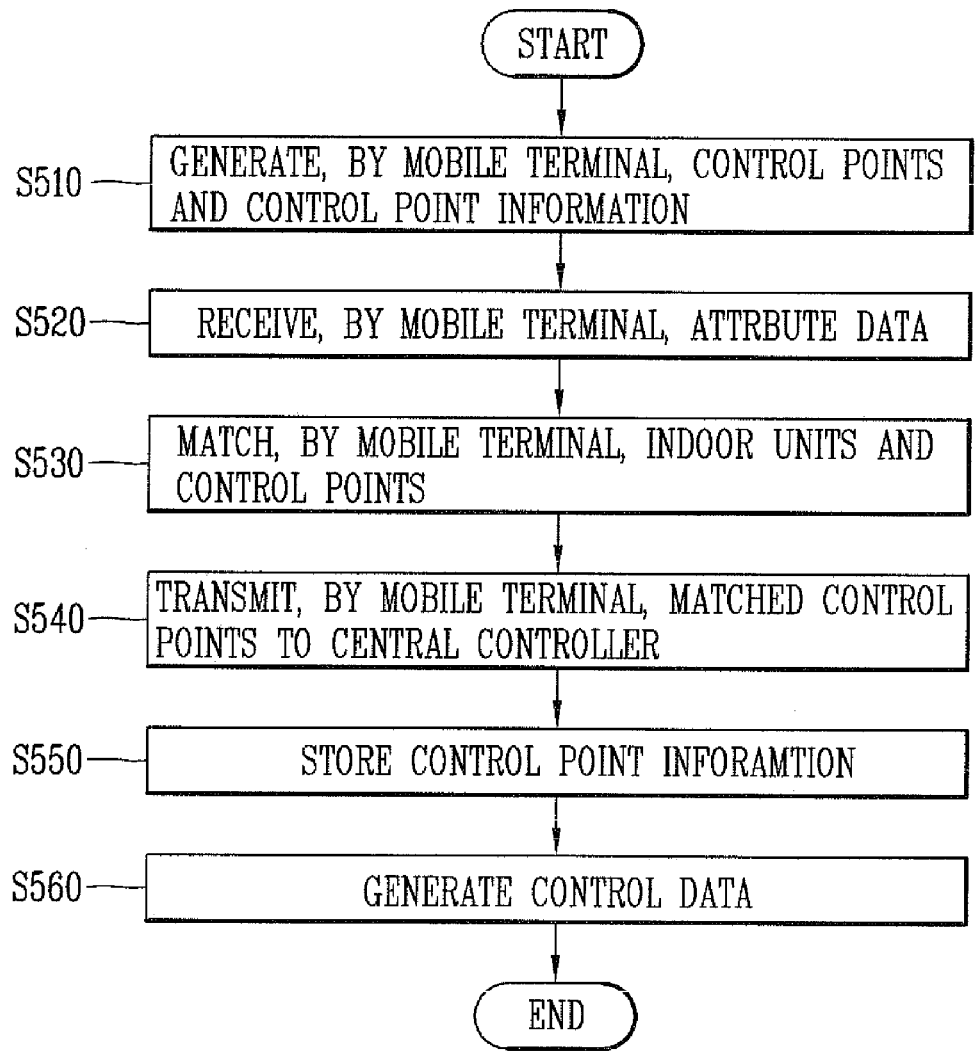

With reference to FIG. 12, according to an embodiment of the present invention, a method for setting a control point in a central control system which includes an air conditioner including a plurality of indoor units performing air-conditioning and one or more outdoor units connected to the indoor units to drive the indoor units, a central controller connected to the air conditioner to centrally control the air conditioner, and a mobile terminal generating a control point with respect to each of the indoor units, includes a step (S510) of generating, by the mobile terminal, a control point with respect to each of the indoor units, and generating a control map in which the control points are positioned, and control point information including position information of the control points and address information of the control points in the control map, a step (S520) of receiving, by the mobile terminal, attribute data items regarding the control point information of the indoor units from the indoor units, a step (S530) of matching, by the mobile terminal, the indoor units and the control points by using the attribute data items, and a step (S540) of transmitting, by the mobile terminal, the control points in which the attribute data items are set to the central controller. Also, the method for setting a control point in a central control system may further include a step (S560) of generating, by the central controller, control data by using the control point information and the attribute data items.

The mobile terminal generates the control map as shown in FIG. 7. The control map includes a plurality of control points, and each of the control points has control point information including position information and address information of the control points in the control map (S510). The mobile terminal may transmit the control point information to the database server so that the control point information can be stored. The mobile terminal may perform communication with the indoor units installed on the spot in actuality according to a wireless communication scheme. As shown in FIG. 6, the mobile terminal receives attribute data from the indoor units (S520). Here, the attribute data may be physical data such as a manufacturer of the indoor units, a product name, a product number, capacity, and the like, attribute values of a physical address and a logical address within the air conditioner, data such as a position of an indoor unit, or the like. The mobile terminal compares the control point information and the attribute data and matches the indoor units and the control points (S530). And then, the mobile terminal transmits again the matching results to the central controller (S540). The database server may store the matching results along with the control point information (S550). The central controller generates control data for controlling the indoor units through the respective control points based on the matching results (S560).

In an embodiment of the present invention, the central controller 200 matches the indoor units and the control points by using the attribute data items.

In the following description, the repeated content and explanation as those in the above embodiment will be omitted.

Figure 13:
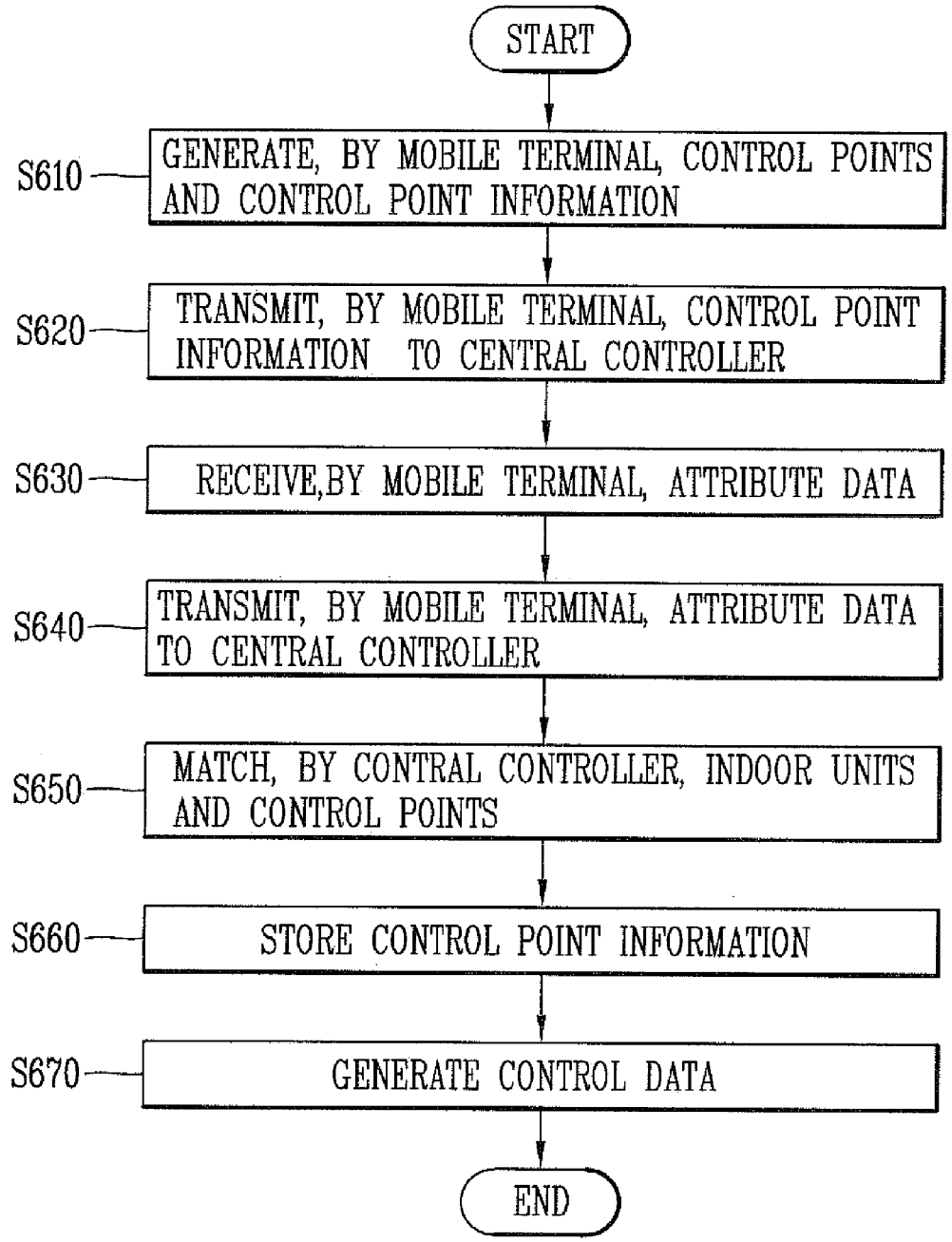

With reference to FIG. 13, according to an embodiment of the present invention, a method for setting a control point in a central control system which includes an air conditioner including a plurality of indoor units performing air-conditioning and one or more outdoor units connected to the indoor units to drive the indoor units, a central controller connected to the air conditioner to centrally control the air conditioner, and a mobile terminal generating a control point with respect to each of the indoor units, includes a step (S610) of generating, by the mobile terminal, a control point with respect to each of the indoor units, and generating a control map in which the control points are positioned, and control point information including position information of the control points and address information of the control points in the control map, a step (S620) of transmitting, by the mobile terminal, the control point information to the central controller, a step (S630) of receiving, by the mobile terminal, attribute data items regarding the control point information of the indoor units from the indoor units, a step (S640) of transmitting, by the mobile terminal, the attribute data items to the central controller, and a step (S650) of matching, by the central controller, the indoor units and the control points by using the attribute data items. Also, the method for setting a control point in a central control system may further include a step (S670) of generating, by the central controller, control data by using the control point information and the attribute data items.

The mobile terminal generates the control map as shown in FIG. 7. The control map includes a plurality of control points, and each of the control points has control point information including position information and address information of the control points in the control map (S610). The mobile terminal may transmit the control point information to the central controller or the database server so that the control point information can be stored (S620). The mobile terminal may perform communication with the indoor units installed on the spot in actuality according to a wireless communication scheme. As shown in FIG. 6, the mobile terminal receives attribute data from the indoor units by using short-range wireless communication, or the like (S630). Here, the attribute data may be physical data such as a manufacturer of the indoor units, a product name, a product number, capacity, and the like, attribute values of a physical address and a logical address within the air conditioner, data such as a position of an indoor unit, or the like. When the mobile terminal transmits the attribute data items, which have been received from the indoor units, to the central controller (S640), the central controller compares the control point information and the attribute data and matches the indoor units and the control points (S650). The central controller generates control data for controlling the indoor units through the respective control points based on the matching results (S670).

The method for setting a control point in the central control system according to embodiments of the present invention may further include a step (S660) of making the control point information into a database and storing the same.

As shown in FIG. 6, in the central control system according to embodiments of the present invention, communication may first be performed with the indoor units through the mobile terminal to receive information regarding the indoor units, attribute data, and the like, and control points may be set by using the information of the mobile terminal. Namely, as shown in FIG. 6, the mobile terminal may receive attribute data items from the indoor units, recognize the positions of the indoor units, and transmit the attribute data items to the central controller or the database server. The central controller may set control points by using the attribute data received from the mobile terminal, generate control data, and control the indoor units by using the control data.

As described above, in the central control system and the method for setting a control point thereof according to embodiments of the present invention, the central controller or the control point generator may generate a control map in which control points are indicated, or the mobile terminal may generate the control map in which control points are indicated, and the control points and the attribute data items of the devices such as the indoor units, or the like, on the spot are matched. Also, in the embodiments of the present invention, the attribute data required for setting the control points is generated as a database by using a dedicated tool such as the central controller or the control point generator, thus automatically setting control points. Also, in the embodiments of the present invention, the central control system can be installed by setting attribute data of the respective control points by using a wireless solution such as a mobile terminal, or the like, without having technical knowledge.

The invention claimed is:

1. A central control system comprising:
    an air conditioner configured to include a plurality of indoor units performing air-conditioning and one or more outdoor units connected to the indoor units to drive the indoor units;
    a central controller configured to generate a control point with respect to each of the indoor units and control the air conditioner by using the control points;
    a mobile terminal configured to receive attribute data items with respect to the control points of the indoor units from the indoor units and transmit the attribute data items to the central controller; and
    a database server configured to be connected to the central controller, to make control point information into a database, and to store the database,
    wherein the mobile terminal receives the control point information stored in the database server, matches the control point information by using the attribute data items, and transmits the control points in which the attribute data items are set to the central controller.

2. The central control system of claim 1, wherein the central controller matches the indoor units and the control points by using the attribute data items.

3. The central control system of claim 1, wherein the mobile terminal matches the indoor units and the control points by using the attribute data items and transmits control points in which the attribute data items are set to the central controller.

4. The central control system of claim 1, wherein the central controller comprises:
    a control module configured to generate a control map in which the control points are positioned, and generate control point information including position information of the control points and address information of the control points in the control map;
    a first communication module configured to transmit control data to the air conditioner and receive operation data from the air conditioner; and
    a second communication module configured to transmit the control point information to the mobile terminal and receive the attribute data items from the mobile terminal.

5. The central control system of claim 4, wherein the mobile terminal comprises:
    a wireless communication unit configured to receive the attribute data items from the indoor units, receive the control information from the second communication module, and transmit the attribute data items or the control points in which the attribute data items are set to the second communication module; and
    a controller configured to set the attribute data items in the control points and match the indoor units and the control points.

6. The central control system of claim 1, further comprising:
    a control point generator configured to generate a control map in which the control points are positioned, and generate control point information including position information of the control points and address information of the control points in the control map.

7. The central control system of claim 1, wherein the database server stores the control point in which the attribute data items are set.

8. The central control system of claim 7, wherein the central controller receives the control points in which the attribute data items are set and control point information from the database server, and generates control data.

9. The central control system of claim 1, wherein the central controller generates control data by using the control point information stored in the database server and the attribute data items received from the mobile terminal.

10. The central control system of claim 1, further including:
    a gateway connected between the central controller and the air conditioner and allowing the central controller to control the air conditioner by converting a communication protocol, or controlling the air conditioner by using an installed control algorithm.

11. A method for setting a control point in a central control system which includes an air conditioner including a plurality of indoor units performing air-conditioning and one or more outdoor units connected to the indoor units to drive the indoor units, a central controller connected to the air conditioner to centrally control the air conditioner, and a database server configured to be connected to the central controller, to make control point information into a database, and to store the database, the method comprising:
    generating a control point with respect to each of the indoor units, and generating a control map in which the control points are positioned, and control point information including position information of the control points and address information of the control points in the control map;
    transmitting the control point information stored in the database server to a mobile terminal;
    receiving, by the mobile terminal, attribute data items regarding the control point information of the indoor units from the indoor units;
    matching, by the mobile terminal, the indoor units and the control points by using the attribute data items; and
    transmitting, by the mobile terminal, the control points in which the attribute data are set to the central controller.

12. The method of claim 11, further comprising:
    generating, by the central controller, control data by using the control point information and the attribute data items.

13. A central control system comprising:
    an air conditioner configured to include a plurality of indoor units performing air-conditioning and one or more outdoor units connected to the indoor units to drive the indoor units;
    a central controller configured to generate a control point with respect to each of the indoor units and control the air conditioner by using the control points; and a mobile terminal configured to receive attribute data items with respect to the control points of the indoor units from the indoor units and transmit the attribute data items to the central controller, wherein the mobile terminal generates a control map in which the control points are positioned, and generates control point information including position information of the control points and address information of the control points in the control map.

* * * * *